(12) United States Patent
Tanaka

(10) Patent No.: US 9,040,179 B2
(45) Date of Patent: May 26, 2015

(54) MAGNETIC RECORDING MEDIUM AND MAGNETIC RECORDING AND REPRODUCING APPARATUS

(75) Inventor: Takashi Tanaka, Ichihara (JP)

(73) Assignee: SHOWA DENKO K.K., Tokyo (JP)

(*) Notice: Subject to any disclaimer, the term of this patent is extended or adjusted under 35 U.S.C. 154(b) by 299 days.

(21) Appl. No.: 13/502,494

(22) PCT Filed: Oct. 18, 2010

(86) PCT No.: PCT/JP2010/068261
§ 371 (c)(1),
(2), (4) Date: Apr. 17, 2012

(87) PCT Pub. No.: WO2011/049039
PCT Pub. Date: Apr. 28, 2011

(65) Prior Publication Data
US 2012/0200958 A1  Aug. 9, 2012

(30) Foreign Application Priority Data
Oct. 19, 2009  (JP) .................................. 2009-240288

(51) Int. Cl.
*G11B 5/66* (2006.01)
*G11B 5/73* (2006.01)
*G11B 5/667* (2006.01)

(52) U.S. Cl.
CPC .............. *G11B 5/7325* (2013.01); *G11B 5/667* (2013.01)

(58) Field of Classification Search
None
See application file for complete search history.

(56) References Cited

U.S. PATENT DOCUMENTS

| 8,088,504 B2 * | 1/2012 | Shimizu ........................ 428/831 |
| 2008/0084632 A1 * | 4/2008 | Shimizu ........................ 360/131 |
| 2009/0116137 A1 | 5/2009 | Takekuma et al. |
| 2010/0309580 A1 | 12/2010 | Tonooka et al. |

FOREIGN PATENT DOCUMENTS

| CN | 1913004 A | 2/2007 |
| CN | 101351842 A | 1/2009 |
| CN | 101923864 A | 12/2010 |
| JP | 2669529 B2 | 10/1997 |

(Continued)

OTHER PUBLICATIONS

International Search Report for PCT/JP2010/068261 dated Jan. 18, 2011.

(Continued)

*Primary Examiner* — Holly Rickman
*Assistant Examiner* — Linda Chau
(74) *Attorney, Agent, or Firm* — Sughrue Mion, PLLC

(57) ABSTRACT

A perpendicular magnetic recording medium of the present invention comprises a non-magnetic substrate, and at least a backing layer, an under layer, an intermediate layer and a perpendicular magnetic recording layer, which are sequentially laminated on the non-magnetic substrate, wherein the backing layer is formed of a soft magnetic film having an amorphous structure, the under layer contains a NiW alloy containing any one or both of Co and Fe, the W content of the NiW alloy is within a range from 3 to 10 atom %, the total of the Co and Fe contents of the NiW alloy is 5 atom % or more and less than 40 atom %, the saturation magnetic flux density Bs of the NiW alloy is 280 emu/cm$^3$ or more, the thickness of the under layer is within a range from 2 to 20 nm, and the intermediate layer contains Ru or a Ru alloy.

7 Claims, 3 Drawing Sheets

(56) References Cited

FOREIGN PATENT DOCUMENTS

| | | |
|---|---|---|
| JP | 2003-123239 A | 4/2003 |
| JP | 2007-73136 A | 3/2007 |
| JP | 2007-179598 A | 7/2007 |
| JP | 2009-116952 A | 5/2009 |
| JP | 2010-287260 A | 12/2010 |

OTHER PUBLICATIONS

Chinese Office Acton issued in corresponding application No. 201080046813.4 dated Mar. 31, 2014.

Chinese Office Action dated Sep. 1, 2014 issued application No. 201080046813.4.

* cited by examiner

MAGNETIC RECORDING MEDIUM AND MAGNETIC RECORDING AND REPRODUCING APPARATUS

TECHNICAL FIELD

The present invention relates to a perpendicular magnetic recording medium for use in a hard disk drive (HDD) or the like, and a magnetic recording/reproducing apparatus.

This application claims priority on Japanese Patent Application No. 2009-240288 filed on Oct. 19, 2009, the disclosure of which is incorporated by reference herein.

BACKGROUND ART

A perpendicular magnetic recording system is a system in which the easy axis of magnetization of a magnetic recording layer, that has hitherto been laid in the in-plane direction of a medium, is laid in the perpendicular direction of the medium. Whereby, the demagnetizing field in the vicinity of the magnetization transitional region constituting the boundary between recording bits is decreased and, therefore, the magnetostatic stability is increased and the resistance to thermal fluctuation is enhanced as the recording density increases. Accordingly, the perpendicular magnetic recording system is a suitable system for improving the areal recording density.

A perpendicular magnetic recording medium is composed of a non-magnetic substrate, and a backing layer (a soft magnetic layer), an under layer, an intermediate layer and a perpendicular magnetic recording layer that are sequentially laminated on the non-magnetic substrate. When the backing layer made of a soft magnetic material is provided between the non-magnetic substrate and the perpendicular magnetic recording layer, the perpendicular magnetic recording medium is capable of functioning as a so-called vertical two-layer medium and acquiring a high recording ability. In this case, the soft magnetic backing layer is fulfilling the role of refluxing the recording magnetic field from the magnetic head and is enabled to enhance the recording/reproducing efficiency.

The under layer is a governing element that determines the particle diameters and orientations of the intermediate layer and perpendicular magnetic recording layer formed thereon, and the selection of the material therefore proves to be very important in order to determine the recording/reproducing properties of the magnetic recording medium. Therefore, various materials used in the under layer have been proposed. For example, Ti alloys (see, for example, Patent Literature 1), NiFeCr alloys (see, for example, Patent Literature 2) and the like have been proposed. These materials can have an hcp structure, an fcc structure, an amorphous structure of Ti and the like.

The interposition of the under layer between the backing layer and the perpendicular magnetic layer causes the distance between the magnetic head and the surface of the backing layer to be increased by the thickness of the under layer. In this case, it becomes necessary to thicken the backing layer so as to perform sufficient writing. However, when the under layer is made of a material having a soft magnetic property, it becomes possible to control the role of the backing layer and the crystal orientation of the intermediate layer disposed thereon.

However, the construction of medium proposed heretofore is not sufficient to obtain a perpendicular magnetic recording medium having excellent recording/reproducing properties.

Therefore, it has been desired to obtain a magnetic recording medium that solves this problem and allows manufacture at low cost.

Thus, the present applicant has proposed a perpendicular magnetic recording medium in which a soft magnetic film that constitutes a backing layer has an amorphous structure, and a NiW alloy is used in an under layer and a Ru alloy is used in an intermediate layer (see Patent Literature 3).

CITATION LIST

Patent Literature

[Patent Literature 1]
  Japanese Patent No. 2,669,529
[Patent Literature 2]
  Japanese Unexamined Patent Application, First Publication No. 2003-123239
[Patent Literature 3]
  Japanese Unexamined Patent Application, First Publication No. 2007-179598

SUMMARY OF INVENTION

Technical Problem

By the way, the under layer is an important layer having a function of controlling the generation of nuclei of an Ru intermediate layer to be formed thereon and is required to have a thickness of about 10 nm. However, since the under layer is present between the soft magnetic backing layer and the perpendicular magnetic recording layer, magnetic coupling between the magnetic head and the soft magnetic backing layer is decreased when the thickness of the under layer is increased, resulting in deterioration of overwrite (OW) properties.

For example, when a 94Ni6W alloy is used in the under layer, the 94Ni6W alloy has a saturation magnetic flux density (Bs) of only about 250 emu/cm$^3$ and the saturation magnetic flux density of this extent is not enough to increase magnetic coupling between the magnetic head and the soft magnetic backing layer. Although Ms of the NiW alloy can be increased by decreasing the W content of the NiW alloy, it slightly varies. Whereby, the function of controlling the generation of nuclei of the Ru intermediate layer also decreases.

Under these conventional circumstances, the present invention has been made and an object thereof is to provide a perpendicular magnetic recording medium that enabled to obtain excellent OW properties by maintaining the effect of controlling the generation of nuclei of an intermediate layer while increasing Ms of the under layer, and a magnetic recording/reproducing apparatus provided with the perpendicular magnetic recording medium.

Solution to Problem

The present invention provides the following means.
(1) A perpendicular magnetic recording medium including a non-magnetic substrate, and at least a backing layer, an under layer, an intermediate layer and a perpendicular magnetic recording layer, which are sequentially laminated on the non-magnetic substrate, wherein
  the backing layer is formed of a soft magnetic film having an amorphous structure,
  the under layer contains a NiW alloy containing any one or both of Co and Fe, the W content of the NiW alloy is within a range from 3 to 10 atom %, the total of the Co and Fe contents of the NiW alloy is 5 atom % or more and less than 40 atom %, the saturation magnetic flux density Bs of the NiW alloy is 280 emu/cm$^3$ or more, the thickness of the under layer is within a range from 2 to 20 nm, and the intermediate layer contains Ru or a Ru alloy.

(2) The perpendicular magnetic recording medium according to the above item (1), wherein the soft magnetic film contains a CoFe alloy.

(3) The perpendicular magnetic recording medium according to the above item (1) or (2), wherein in the Fe content of the CoFe alloy is within a range from 5 to 60 atom %.

(4) A magnetic recording/reproducing apparatus including the perpendicular magnetic recording medium according to any one of the above items (1) to (3), and a magnetic monopole head that performs writing of information to the perpendicular magnetic recording medium.

Advantageous Effects of Invention

As described above, according to the present invention, it is possible to increase a saturation magnetic flux density Bs of a NiW alloy to 280 emu/cm$^3$ or more by adding Fe or Co to the NiW alloy that constitutes the under layer. It is also possible to maintain the effect of controlling the generation of nuclei of an intermediate layer made of Ru or a Ru alloy to be formed thereon. Accordingly, according to the present invention, it is possible to provide a perpendicular magnetic recording medium having excellent OW properties, and a magnetic recording/reproducing apparatus provided with the perpendicular magnetic recording medium.

DESCRIPTION OF EMBODIMENTS

The perpendicular magnetic recording medium and the magnetic recording/reproducing apparatus, to which the present invention is applied, will be described in detail below with reference to the accompanying drawings.

To make understanding of the feature of the drawings used in the following description easier, the characterizing section is sometimes illustrated at an enlarged scale for convenience, and dimensional ratios of the respective components are not necessarily the same as actual dimensional ratios.

(Perpendicular Magnetic Recording Medium)

Figure 1:
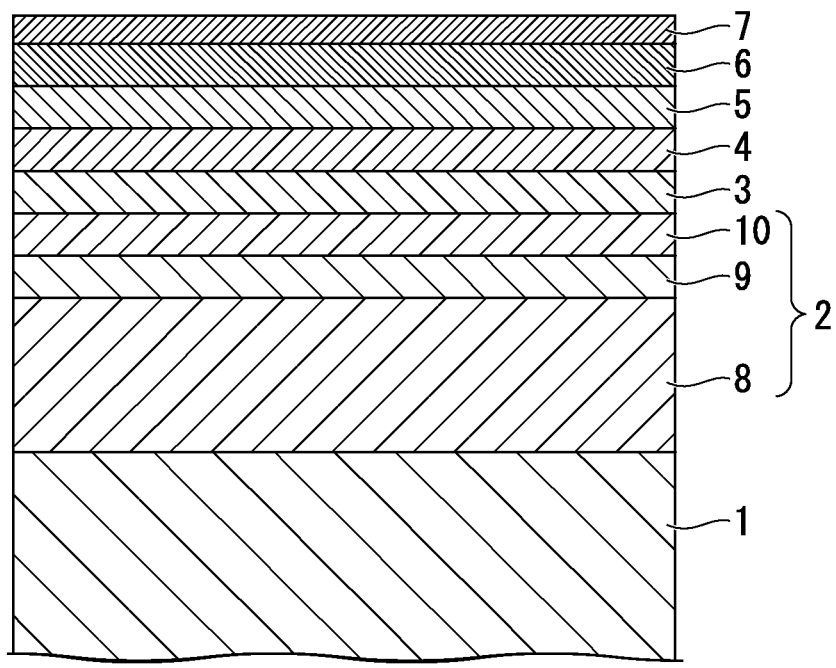
FIG. 1 is a sectional view showing an example of a perpendicular magnetic recording medium to which the present invention is applied.

As shown in FIG. 1, a perpendicular magnetic recording medium, to which the present invention is applied, has such a construction that a backing layer 2, an under layer 3, an intermediate layer 4, a perpendicular magnetic recording layer 5 and a protective layer 6 are sequentially laminated on both surfaces of a non-magnetic substrate 1, and also a lubricating film 7 is formed on the uppermost layers. In FIG. 1, only one surface of the non-magnetic substrate 1 is shown.

As the non-magnetic substrate 1 among these components, for example, metallic substrates made of metallic materials such as aluminum and aluminum alloys may be used, and also non-metallic substrates made of non-metallic materials such as glass, ceramic, silicon, silicon carbide and carbon may be used.

As the glass substrate, for example, those made of amorphous glass and crystallized glass can be used. As the amorphous glass, soda-lime glass and aluminosilicate glass of the all-purpose grade can be used. As the crystallized glass, a lithium-based crystallized glass or the like can be used.

From the viewpoint of increasing the recording density, an average surface roughness Ra of the non-magnetic substrate 1 is preferably 0.8 nm or less, and more preferably 0.5 nm or less. The tiny undulation (Wa) of the surface of the non-magnetic substrate 1 is preferably 0.3 nm or less, and more preferably 0.25 nm or less, from the viewpoint of recording with high recording density by enabling the magnetic head to float in a low height. Flattening of the surface of the non-magnetic substrate 1 enables enhancement of crystal orientation of the intermediate layer 4 and the perpendicular magnetic recording layer 5, improvement of recording/reproducing properties, and floating of the head in a low height.

The backing layer 2 has a structure in which a first soft magnetic film 8, a Ru film 9 and a second soft magnetic film 10 are sequentially laminated. That is, when the Ru film 9 is interposed between two layers of the soft magnetic films 8 and 10, the backing layer 2 has a structure in which the soft magnetic films 8 and 10 overlying and underlying the Ru film 9 are coupled together by an anti-ferromagnetic coupling (AFP). This configuration enables enhancement of the resistance to the external magnetic field and the resistance to the phenomenon of wide area track erasure (WATE) that is a problem inherent in the perpendicular magnetic recording.

The first and second soft magnetic films 8 and 10 are, for example, made of a CoFe alloy. Use of the CoFe alloy in these soft magnetic films 8 and 10 enables realization of high saturation magnetic flux density of Bs (1.4 (T) or more), and use of the NiW alloy in the below-mentioned under layer 3 enables to obtain excellent recording/reproducing properties. In case of forming the first and second soft magnetic films 8 and 10, a CoFe alloy film is preferably formed by a sputtering method in a state where the magnetic field is applied in the radius direction of the non-magnetic substrate 1.

Any one of Zr, Ta and Nb is preferably added to the CoFe alloy. The addition enables promotion of the amorphousness of the CoFe alloy and enables enhancement of the orientation of the NiW alloy. The amount of Zr, Ta and Nb to be added to the CoFe alloy is preferably within a range from 5 to 15 atom %.

The Fe content of the CoFe alloy is preferably within a range from 5 to 60 atom %. When the Fe content is less than 5 atom %, the saturation magnetic flux density Bs may decrease, unfavorably. In contrast, when the Fe content exceeds 60 atom %, corrosiveness may deteriorate, unfavorably.

The thickness of the backing layer 2 is preferably within a range from 20 to 80 nm. When the thickness of the backing layer 2 is less than 20 nm, magnetic flux from the magnetic head cannot be sufficiently absorbed, resulting in insufficient writing and deterioration of recording/reproducing properties, unfavorably. In contrast, when the thickness of the backing layer 2 exceeds 80 nm, productivity may drastically deteriorate, unfavorably.

When the first and second soft magnetic films 8 and 10 have an amorphous structure, it is possible to prevent surface roughness Ra of the backing layer 2 from being increased. Whereby, it becomes possible to decrease the amount of the flotation of the magnetic head and also to realize higher recording density.

Figure 2:
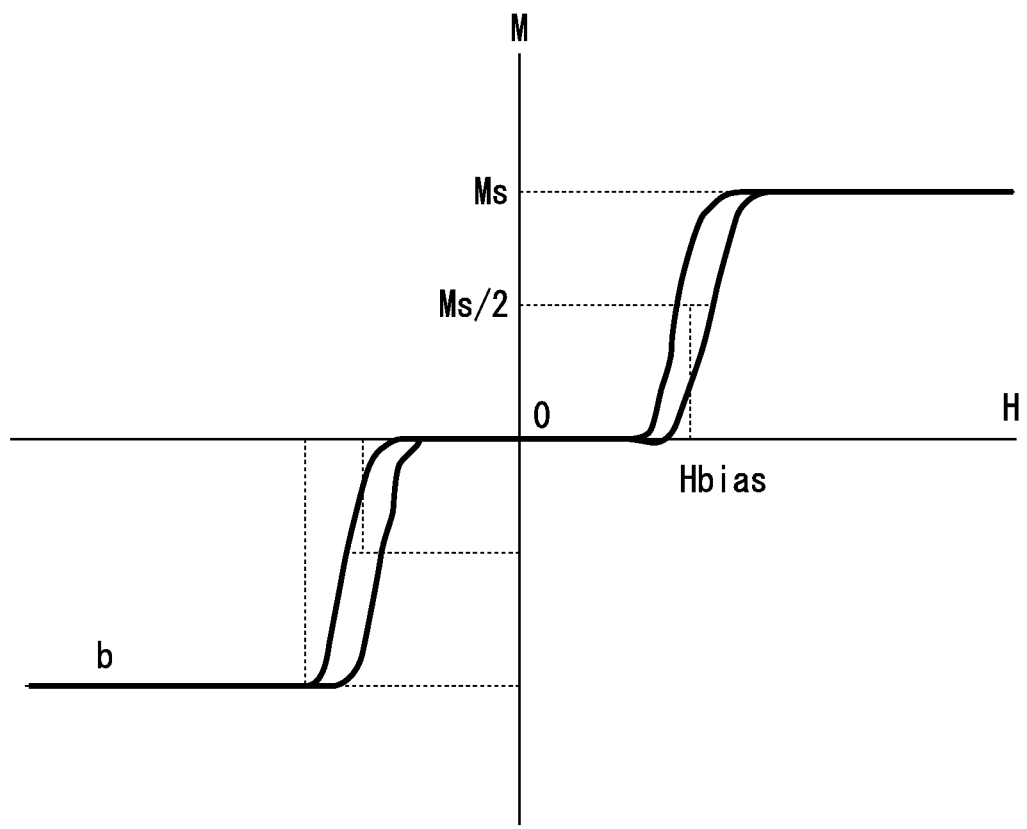
FIG. 2 is a characteristic graph showing a HS loop in a substrate in-plane component of a backing layer, in which the ordinate denotes the magnetization value of the backing layer, while the abscissa denotes the applied magnetic field.

Herein, when "Hbias" is defined as the index showing the magnitude of AFC in the first and second soft magnetic films 8 and 10 that constitute the backing layer 2, the value of Hbias of the backing layer 2 is preferably 80 (Oe) or more. Whereby, it is made possible to enhance the resistance to the external magnetic field and the resistance to WATE. As shown in FIG. 2, on the assumption that Ms denotes the saturation flux density, the applied magnetic field whose magnitude is Ms/2, i.e. one half of the saturation flux density Ms, is defined as "Hbias". It is possible to adjust the value of Hbias within the above range by using the materials mentioned above for the first and second soft magnetic films 8 and 10 and also adjusting the thickness of the Ru film 9 interposed between these soft magnetic films 8 and 10 to a predetermined thickness (for example, 0.6 to 0.8 nm). FIG. 2 shows a hysteresis (MH) loop in the substrate in-plane component of the backing layer 2 (the direction of the easy axis of magnetization of the soft magnetic films 8 and 10 that forms the backing layer 2). In a graph of FIG. 2, the ordinate denotes the magnetization value of the backing layer 2, while the abscissa denotes the applied magnetic field.

Each coercive force Hc of the first and second soft magnetic films 8 and 10 is preferably adjusted to 10 (Oe) or less, and more preferably 5 (Oe) or less. 1 (Oe) is about 79 A/m.

The under layer 3 is aimed at controlling the orientation and the crystal size of the perpendicular magnetic recording layer 5 provided thereon. The under layer 3 is provided so as to increase a component, which is in a direction perpendicular to a surface of a substrate, of a magnetic flux to be generated from a magnetic head, and to fix the direction of the magnetization of the perpendicular magnetic recording layer 5, in which information is recorded, more strongly to the direction perpendicular to the non-magnetic substrate 1. This action becomes more remarkable when a magnetic monopole head for perpendicular recording is used as a magnetic head for recording/reproducing.

The under layer 3 is made of a NiW alloy, and also the NiW alloy contains any one or both of Co and Fe. It is preferred that the W content of the NiW alloy is within a range from 3 to 10 atom %, and the total of the Co and Fe contents are 5 atom % or more and less than 40 atom %.

It is not preferred that the W content of the NiW alloy be less than 3 atom % or more than 10 atom % since the effect of controlling the orientation or crystal size of the perpendicular magnetic recording medium deteriorates. It is not preferred that the total of the Co and Fe contents be less than 5 atom % since it becomes difficult to increase the saturation magnetic flux density Bs of this alloy to 280 emu/cm$^3$ or more. It is not preferred that the total of the Co and Fe contents become 40 atom % or more since the effect of controlling the orientation or crystal size of the perpendicular magnetic recording medium deteriorates.

In the present invention, it is possible to increase the saturation magnetic flux density Bs of the NiW alloy to 280 emu/cm$^3$ or more by adding Fe or Co to the NiW alloy that constitutes the under layer 3. It is also possible to maintain the effect of controlling the generation of nuclei of the intermediate layer 4 made of Ru or a Ru alloy to be formed thereon.

For the purpose of decreasing the crystal size and enhancing the matching property of the crystal lattice size with the intermediate layer 4, other elements can be added to the NiW alloy. For the purpose of decreasing the crystal size, B, Mn and the like may be added. In this case, the B content and the Mn content are preferably 6 atom % or less. For the purpose of enhancing the matching property of the crystal lattice size with the intermediate layer 4, Ru, Pt, Mo, Ta and the like can be added.

The thickness of the under layer 3 is preferably within a range from 2 to 20 nm. When the thickness of the under layer 3 is less than 2 nm, the effect as the under layer 3 becomes insufficient and the effect of decreasing the particle diameter cannot be obtained, resulting in deterioration of orientation, unfavorably. In contrast, when the thickness of the under layer 3 exceeds 20 nm, the crystal size increases, unfavorably.

The intermediate layer 4 is a layer that is aimed at forming the perpendicular magnetic layer into a c-axis oriented columnar crystal, and the growth surface thereof has a dome shape. Such an intermediate layer 4 is made, for example, of Ru or a Ru alloy. The thickness of the intermediate layer 4 is preferably 30 nm or less, and more preferably 16 nm or less. By decreasing the thickness of the intermediate layer 4, it is made possible to shorten the distance between the magnetic head and the backing layer 2 and impart a precipitous shape to the magnetic flux from the magnetic head. As a result, it is also made possible to further decrease the thickness of the backing layer 2 and improve the productivity of the layer.

The perpendicular magnetic recording layer 5 is composed of a magnetic film having an easy axis of magnetization in a direction perpendicular to the surface of the substrate. The perpendicular magnetic recording layer 5 contains at least Co and Pt.

For the purpose of improving SNR properties, oxides, Cr, B, Cu, Ta, Zr and the like may be added to the perpendicular magnetic recording layer 5. Examples of the oxide include $SiO_2$, SiO, $Cr_2O_3$, CoO, $Ta_2O_3$, $TiO_2$ and the like.

The volume ratio of the oxide is preferably from 15 to 40% by volume. When the volume ratio of the oxide is less than 15% by volume, SNR properties become insufficient, unfavorably. In contrast, when the volume ratio of the oxide exceeds 40% by volume, it is impossible to obtain a coercive force conforming to the high recording density, unfavorably.

The nucleation magnetic field (−Hn) of the perpendicular magnetic recording film 5 is preferably 2.0 kOe or more. When the −Hn is less than 2.0 kOe, thermal fluctuation occurs, unfavorably.

The thickness of the perpendicular magnetic recording layer 5 is preferably within a range from 6 to 20 nm. When the thickness of the oxide granular layer is within the above range, it is possible to secure the output sufficiently thereby preventing deterioration of the OW properties, favorably.

The perpendicular magnetic recording film 5 may be formed in a monolayer structure or in a structure of two or more layers made of materials differing in composition.

The protective layer 6 is aimed at protecting the perpendicular magnetic recording film 5 from corrosion and preventing the magnetic head from inflicting damage to the surface of the medium when it contacts the medium. It is possible to use conventionally known materials, for example, materials containing C, $SiO_2$ and $ZrO_2$ for the protective layer 6. The thickness of the protective film 6 is preferably within a range from 1 nm to 5 nm from the viewpoint of high recording density. When the thickness of the protective film 6 is within the above range, the distance between the magnetic head and the surface of the medium can be decreased.

It is possible to use conventionally known materials, for example, perfluoropolyether, fluorinated alcohol, fluorinated carboxylic acid and the like for the lubricating film 7.

As described above, in the perpendicular magnetic recording medium to which the present invention is applied, it is possible to increase a saturation magnetic flux density Bs of a NiW alloy to 280 emu/cm$^3$ or more by adding Fe or Co to the NiW alloy that constitutes the under layer 3. It is also possible to maintain the effect of controlling the generation of nuclei of the intermediate layer 4 made of Ru or a Ru alloy to be formed on the under layer 3. Accordingly, according to the present invention, it is possible to provide a perpendicular magnetic recording medium having excellent OW properties, and a magnetic recording/reproducing apparatus provided with the perpendicular magnetic recording medium.

(Magnetic Recording/Reproducing Apparatus)

Figure 3:
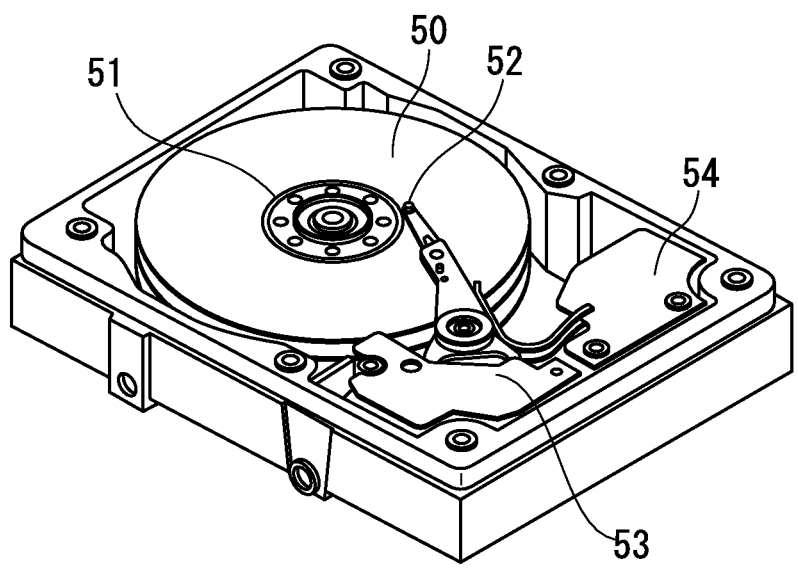
FIG. 3 is a perspective view showing an example of a magnetic recording/reproducing apparatus to which the present invention is applied.

FIG. 3 shows an example of a magnetic recording/reproducing apparatus to which the present invention is applied.

The magnetic recording/reproducing apparatus includes a perpendicular magnetic recording medium 50 with the construction shown in FIG. 1, a medium driving section 51 for rotationally driving the perpendicular magnetic recording medium 50, a magnetic head 52 for causing the perpendicular magnetic recording medium 50 to record and reproduce information, a head driving section 53 for moving the magnetic head 52 relatively to the perpendicular magnetic recording medium 50 and a recording/reproducing signal processing system 54. The recording/reproducing signal processing system 54 is adapted to process data input from the outside and transmit the resultant recording signal to the magnetic head 52 and process a reproducing signal received from the magnetic head 52 and output the resultant data.

In the magnetic recording/reproducing apparatus to which the present invention is applied, in order to meet the requirement of higher recording density of the perpendicular magnetic recording medium, a magnetic monopole head having an excellent ability of writing to the perpendicular magnetic recording layer 5 is used as the magnetic head 52. In the perpendicular magnetic recording medium, in order to cope with the magnetic monopole head, a trial is made to improve efficiency of entry and exit of a magnetic flux between the magnetic monopole head and the perpendicular magnetic recording layer 5 by providing a backing layer 2 between the non-magnetic substrate 1 and the perpendicular magnetic recording layer 5.

In the magnetic recording/reproducing apparatus, it is possible to use a magnetic head 52 including, as a reproducing element, a GMR element or the like utilizing a giant magneto resistive effect (GMR), that is more suited for high recording density.

The present invention is not necessarily limited to the above embodiments and various modifications can be made without departing from the scope of the present invention.

For example, the present invention can also be applied to a perpendicular magnetic recording medium having magnetically separated magnetic recording patterns in the above perpendicular magnetic recording layer 5. Specific examples of the magnetic recording medium having recording patterns include a so-called patterned medium having magnetic recording patterns arranged thereon with a specified bit-by-bit regularity, a medium having magnetic recording patterns arranged thereon in the form of tracks, a medium with servo signal patterns and the like.

EXAMPLES

The effects of the present invention will be more clarified below by way of Examples. The present invention is not limited to the following Examples and modifications can be appropriately made without departing from the scope of the present invention.

In the present Example, first, a glass substrate (an amorphous substrate of 2.5 inches in diameter, manufactured by MYG Corp. under trade name of MEL3) was used as a non-magnetic substrate and placed in a film-forming chamber of a DC magnetron sputtering device (manufactured by Anelva Corp. under the trade name of C-3010). The interior of the film-forming chamber was evacuated till the degree of vacuum reached $1\times10^{-5}$ Pa. On this glass substrate, a first soft magnetic layer made of 71Co-20Fe-5Zr-4Nb (the Co content of 71 atom %, the Fe content of 20 atom %, the Zr content of 5 atom % and the Nb content of 4 atom %) in a thickness of 20 nm (Examples 1 to 8, Comparative Examples 1 to 5, 8 and 9), a Ru film in a thickness of 0.8 nm, and a second soft magnetic layer made of 71Co-20Fe-5Zr-4Nb in a thickness of 20 nm (Examples 1 to 8, Comparative Examples 1 to 5, 8 and 9) were formed to obtain a backing layer. In Comparative Example 6, the thickness of each soft magnetic layer was adjusted to 12.5 nm. In Comparative Example 7, the thickness of each soft magnetic layer was adjusted to 27.5 nm. It was confirmed by XRD (X-ray diffraction) that these soft magnetic layers have an amorphous structure as a crystal structure.

Subsequently, an under layer, each having a different composition and layer thickness as shown in Table 1 and Table 2, was formed thereon, and an intermediate layer made of Ru in a thickness of 12 nm, a perpendicular magnetic recording layer made of 60Co-10Cr-20Pt-10SiO$_2$ in a thickness of 10 nm and a perpendicular magnetic recording layer made of 65Co-18Cr-14Pt-3B in a thickness of 6 nm were formed thereon. A protective layer in a thickness of 4 nm was formed thereon by a CVD method and then a lubricating film made of perfluoropolyether was formed by a dipping method to obtain perpendicular magnetic recording media of Examples 1 to 8 and Comparative Examples 1 to 4.

With respect to these perpendicular magnetic recording media of Examples 1 to 8 and Comparative Examples 1 to 4, recording/reproducing properties and overwrite (OW) properties were evaluated. The evaluation results are shown in Table 1 and Table 2. In Table 1 and Table 2, the saturation magnetic flux density Bs of each under layer is shown.

TABLE 1

|  | Under layer | | | Backing | Magnetic recording medium | |
| --- | --- | --- | --- | --- | --- | --- |
|  | Composition (atom %) | Layer thickness (nm) | Bs (emu/cm$^3$) | layer (nm) | S/N (dB) | OW (dB) |
| Example 1 | Ni10Fe6W | 10 | 430 | 40 | 24.2 | 37 |
| Example 2 | Ni20Fe6W | 10 | 610 | 40 | 24.1 | 37.9 |
| Example 3 | Ni20Fe3.3W | 10 | 710 | 40 | 24 | 38.8 |
| Example 4 | Ni20Co6W | 10 | 510 | 40 | 24.2 | 37.6 |
| Example 5 | Ni30Co6W | 10 | 640 | 40 | 24.1 | 38.2 |
| Example 6 | Ni20Fe6W | 5 | 610 | 40 | 24 | 36.8 |

TABLE 1-continued

| | Under layer | | | Backing layer (nm) | Magnetic recording medium | |
|---|---|---|---|---|---|---|
| | Composition (atom %) | Layer thickness (nm) | Bs (emu/cm³) | | S/N (dB) | OW (dB) |
| Example 7 | Ni20Fe6W | 20 | 610 | 40 | 23.9 | 38.1 |
| Example 8 | Ni20Fe10Co6W | 10 | 740 | 40 | 24.2 | 38.9 |

TABLE 2

| | Under layer | | | Backing layer (nm) | Magnetic recording medium | |
|---|---|---|---|---|---|---|
| | Composition (atom %) | Layer thickness (nm) | Bs (emu/cm³) | | S/N (dB) | OW (dB) |
| Comparative Example 1 | Ni6W | 10 | 250 | 40 | 24.2 | 36.1 |
| Comparative Example 2 | Ni40Co6W | 10 | 770 | 40 | 23.8 | 38.9 |
| Comparative Example 3 | Ni20Fe6W | 1 | 610 | 40 | 23.5 | 36.6 |
| Comparative Example 4 | Ni20Fe6W | 25 | 610 | 40 | 23.6 | 36.9 |
| Comparative Example 5 | Ni20Fe20Co6W | 10 | 865 | 40 | 23.4 | 39.5 |
| Comparative Example 6 | Ni6W | 10 | 250 | 25 | 24.1 | 34.4 |
| Comparative Example 7 | Ni6W | 10 | 250 | 55 | 23.3 | 37.3 |
| Comparative Example 8 | Ni2W | 10 | 342 | 40 | 23.3 | 36.6 |
| Comparative Example 9 | Ni12W | 10 | 0 | 40 | 22.8 | 34.3 |

The recording/reproducing properties were evaluated by setting recording frequency conditions at a linear recording density of 1,000 kFCI using a magnetic head provided with a magnetic monopole head in a recording section and with a GMR element in a reproducing section.

The overwrite (OW) properties were evaluated by first writing a signal of 500 kFCI, then writing a signal of 67 kFCI thereon and measuring the reissue of the first signal. The evaluation results are shown in Table 1 and Table 2.

As shown in Table 1 and Table 2, the perpendicular magnetic recording media of Examples 1 to 8 suppressed a decrease in S/N to the utmost as compared with the perpendicular magnetic recording media of Comparative Examples 1 to 4, and also exhibited excellent OW properties. In Comparative Example 2, OW properties are excellent, but S/N decreases.

REFERENCE SIGNS LIST

1: Non-magnetic substrate
2: Backing layer
3: Under layer
4: Intermediate layer
5: Perpendicular magnetic recording layer
6: Protective layer
7: Lubricating film
8: First soft magnetic film
9: Ru film
10: Second soft magnetic film
50: Perpendicular magnetic recording medium
51: Medium driving section
52: Magnetic head
53: Head driving section
54: Recording/reproducing signal processing system

The invention claimed is:

1. A perpendicular magnetic recording medium comprising a non-magnetic substrate, and at least a backing layer, an under layer, an intermediate layer and a perpendicular magnetic recording layer, which are sequentially laminated on the non-magnetic substrate, wherein
the backing layer is formed of a soft magnetic film having an amorphous structure,
the under layer contains a NiW alloy containing any one or both of Co and Fe,
the W content of the NiW alloy is within a range from 3 to 10 atom %,
the total of the Co and Fe contents of the NiW alloy is 20 atom % or more and less than 40 atom %,
the saturation magnetic flux density Bs of the NiW alloy is 280 emu/cm³ or more,
the thickness of the under layer is within a range from 10 to 20 nm, the under layer directly has contact with the backing layer, and
the intermediate layer contains Ru or a Ru alloy.

2. The perpendicular magnetic recording medium according to claim 1, wherein the soft magnetic film contains a CoFe alloy.

3. The perpendicular magnetic recording medium according to claim 2, wherein the Fe content of the CoFe alloy is within a range from 5 to 60 atom %.

4. A magnetic recording/reproducing apparatus comprising the perpendicular magnetic recording medium according to claim 1, and a magnetic monopole head that performs writing of information to the perpendicular magnetic recording medium.

5. A magnetic recording/reproducing apparatus comprising the perpendicular magnetic recording medium according to claim 2, and a magnetic monopole head that performs writing of information to the perpendicular magnetic recording medium.

6. A magnetic recording/reproducing apparatus comprising the perpendicular magnetic recording medium according to claim 3, and a magnetic monopole head that performs writing of information to the perpendicular magnetic recording medium.

7. The perpendicular magnetic recording medium according to claim 1, wherein the under layer contains the NiW alloy containing both of Co and Fe.

* * * * *